United States Patent [19]
Harrison et al.

[11] Patent Number: 6,074,475
[45] Date of Patent: Jun. 13, 2000

[54] THERMOSETTING SYNTACTIC FOAMS AND THEIR PREPARATION

[75] Inventors: Edward S. Harrison, Idyllwild, Calif.; Donald J. Bridges, Mesa; James L. Melquist, Tempe, both of Ariz.

[73] Assignee: McDonnell Douglas Corporation, St. Louis, Mo.

[21] Appl. No.: 09/247,382

[22] Filed: Feb. 10, 1999

Related U.S. Application Data

[62] Division of application No. 08/965,282, Nov. 6, 1997.

[51] Int. Cl.[7] ....................................... C08J 9/32
[52] U.S. Cl. .......................... 106/605; 106/634; 106/636; 106/409; 106/472; 106/489; 521/919; 523/218
[58] Field of Search ..................................... 106/605, 634, 106/636, 676, 677, 409, 472, 489; 521/919; 523/218

[56] References Cited

U.S. PATENT DOCUMENTS

| | | |
|---|---|---|
| 2,806,509 | 9/1957 | Bozzacco et al. . |
| 4,595,623 | 6/1986 | DuPont et al. . |
| 4,861,649 | 8/1989 | Browne . |
| 4,865,784 | 9/1989 | Hill . |
| 5,032,627 | 7/1991 | Wilson et al. . |
| 5,120,769 | 6/1992 | Dyksterhouse et al. . |
| 5,356,958 | 10/1994 | Matthews . |
| 5,532,295 | 7/1996 | Harrison et al. . |
| 5,587,231 | 12/1996 | Mereer et al. . |

FOREIGN PATENT DOCUMENTS 1372845  11/1974  United Kingdom .

*Primary Examiner*—Blaine Copenheaver
*Attorney, Agent, or Firm*—Alston & Bird LLP

[57] ABSTRACT

A low-density, syntactic foam material is provided according to the invention. The syntactic foam material is prepared by mixing together a plurality of microballoons and a finely divided solid thermosetting resin. Fibers are also preferably incorporated into the material during processing to impart specific properties. The mixture is heated to allow the thermosetting resin to flow and wet the microballoons in the mixture. The mixture is then cured to set and crosslink the thermosetting resin to form the syntactic foam of the invention. The syntactic foam material has highly uniform properties and can be used in aerospace applications.

9 Claims, 1 Drawing Sheet

THERMOSETTING SYNTACTIC FOAMS AND THEIR PREPARATION

CROSS REFERENCE TO RELATED APPLICATIONS

This application is a division of U.S. patent application Ser. No. 08/965,282, filed Nov. 6, 1997, pending.

FIELD OF THE INVENTION

This invention relates to structural materials having low densities, and, more particularly, to a nonmetallic, low-density, syntactic foam material and to methods of preparing same.

BACKGROUND OF THE INVENTION

Low-density nonmetallic materials with good mechanical properties have found utility in various applications including aerospace applications. For example, radomes that house radar antennas are generally required to have sufficient strength to withstand aerodynamic forces. Nevertheless, the material used to construct the radome cannot interfere with the signals transmitted therethrough. In another example, stiffened sandwich core structures are formed by placing a core of material between spaced-apart face sheets. The core spaces the stiff face sheets apart and stabilizes the face sheets so that the structure has a high flexural rigidity.

In these applications, it is often desired that the materials of construction have as low a density as possible while achieving the requires mechanical properties. The low density materials provide many advantages over higher density materials. For example, the low density materials are lighter weight which leads to reduced fuel consumption in aircraft uses. Additionally, low density and weight may also be desirable in specialized non-aircraft applications such as rotating machinery to reduce inertia forces.

Structural metals of relatively low density such as aluminum have been widely used for many decades. More recently, structural nonmetallic materials such as graphite/epoxy composite materials have been developed and have entered service. Foamed polymeric materials have also found many uses. The latter class of materials have densities even less than the polymeric materials from which they are constituted, since a portion of the interior of the material is made up of distributed voids that are produced in the material.

One example of these polymeric foam materials are syntactic foams. Syntactic foams are typically formed of microballoons which are distributed throughout a polymeric matrix. Often, these syntactic foam materials are formed of curable polymeric materials and can include other additives or materials such as reinforcing fibers.

U.S. Pat. No. 4,595,623 to DuPont et al. describes syntactic foams formed from liquid thermosetting resins which can be used to produce lightweight structures for spacecraft applications. Nevertheless, the use of liquid resin materials in polymeric foam materials has some disadvantages. For example, liquid resin materials when used to form these structures do not produce highly uniform distributions of the solid materials in the foam such as fibers. Specifically, the fibers will follow fluid flow lines during the formation of the foam structures. As a result, fibers in the syntactic foam will align in the flow direction during mixing and mold filling resulting in an anisotropic foam structure.

SUMMARY OF THE INVENTION

The present invention provides a method of preparing a syntactic foam material which can be used to prepare low density structures for various applications including aerospace applications. The syntactic foams have a uniform distribution of microballoons throughout the resin matrix. Furthermore, fibers used in the syntactic foams maintain a random orientation and uniform distribution during the cure process to maintain good material performance. Moreover, the syntactic foam material of the present invention has desirable electrical characteristics (e.g., RF signal absorption) for aerospace applications. There is also great flexibility in the processing of the syntactic foam material which allows for control of the final density and mechanical properties of the material thus allowing the material to be tailored for specific applications.

The method of preparing a structural, low-density article according to the invention comprises mixing a plurality of microballoons and a finely divided solid thermosetting resin such as an epoxy resin. The mixture can also include short length fibers which form a network in the resin matrix prior to curing. The mixture is then heated to a processing temperature for a time sufficient for the thermosetting resin to flow and to wet the microballoons and fibers. The thermosetting resin is thereafter cured to form a syntactic foam material having highly uniform structure and properties. The thermosetting resin can be cured at moderate temperatures so that high-temperature mold materials are not required. The thermosetting resin can also be cured in more than one step to provide the syntactic foam of the invention. For example, it may be desirable for thicker molds to alternate increasing the temperature of the mold and maintaining the mixture at a substantially constant temperature. The mixture can also be compressed during curing if higher density foams are desired. The resulting syntactic foam material can be prepared in a semifinished form and machined into articles, or the material can be formed to its final shape.

In the method of the invention, a dry resin mixture comprising the thermosetting resin, microballoons, and optionally fibers, can be placed into a mold prior to heating. For example, the dry resin mixture can be placed in a mold having a controllable final volume and the volume can be controlled during heating to attain a final preselected volume. In this particular situation, the density of the material can be controlled for a fixed amount of microballoons and thermosetting resin, by reducing the final volume of the mold. Alternatively, the volume of a fixed shape mold can be determined and the dry resin mixture weighed out to fill the volume to meet a specific target density. In either case, the mold can be further lined with a dry fabric having an intimately contacting thermosetting dry resin coated on the fabric and distributed throughout the fabric and the thermosetting resin can be cocured with the thermosetting resin of the dry resin mixture to form the syntactic foam article. Advantageously, the skin can be integrated into the syntactic foam material without the preparation of a separate liquid resin prepreg prior to adding the dry resin material to the mold.

The present invention also includes structural, low-density syntactic foam articles having highly uniform properties and comprising a cured epoxy thermosetting resin matrix and a plurality of uniformly distributed microballoons embedded within the resin matrix. The article preferably further includes a plurality of uniformly distributed and randomly oriented short length fibers also embedded within the resin matrix thereby providing a mechanical network for the material prior to curing. Additionally, the fibers can be used to reduce the bulk density of the mixed components allowing fabrication of lower density articles. The fibers can also be selected to impart certain electrical properties to the foam material, e.g., RF signal absorption. The material can also contain air in interstices to controllably reduce the density of the material. Thus, the properties can be manipulated by selectively and controllably retaining air within interstices of the material during manufacture and by controlling fiber volume.

Other features and advantages of the present invention will be apparent to one skilled in the art upon reading the detailed description of the preferred embodiments, taken in conjunction with the accompanying drawings, which illustrate, by way of example, the principles of the invention.

DETAILED DESCRIPTION OF THE INVENTION

The present invention will be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
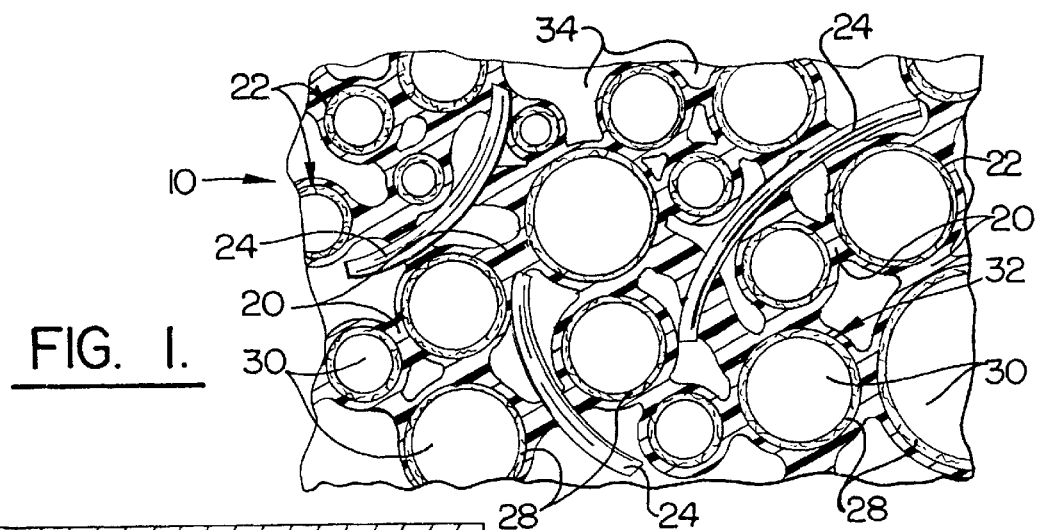
FIG. 1 is a schematic drawing of the microstructure of a syntactic foam material of the invention.

FIG. 1 illustrates the microstructure of a consolidated and cured syntactic foam material 10 of the invention in cross-section. The microstructure includes a thermosetting resin 20, a plurality of microballoons 22, and a plurality of short length fibers 24. The microballoons 22 and short length fibers 24 are preferably evenly distributed throughout the foam material 10 to provide consistent mechanical properties throughout the foam material. The short length fibers 24 are also preferably randomly oriented to provide uniform electrical properties in the foam material 10. Nevertheless, a small amount of fiber orientation can occur during compaction of the foam such that slightly greater electrical properties occur in the direction of compaction. The microballoons 22 and the fibers 24 are bonded together by the thermosetting resin 20 in an array 32. Within the array 32, there are air-filled interstices 34, which can be open-celled depending upon the density of the foam material, the resin, the microballoon contents, and the compaction ratio.

The syntactic foam material 10 of the invention is prepared by first mixing the microballoons 22 and the short length fibers 24 in water to form a wet slurry having a consistency similar to that of wet sand. Excess water is then removed by filtering the wet slurry such as through a fine stainless steel screen. The slurry mixture is then dried by suitable means to form a dry mixture. It has been discovered that forming a wet slurry of the microballoons and fibers and subsequently drying the slurry provides a dry mixture having uniformly distributed microballoons and fibers. In particular, this method is preferred over dry mixing techniques such as vibration techniques which tend to cause the fibers to migrate to the top portion of the dry mixture resulting in a non-uniform distribution of the fibers in the mixture.

The particulate, thermosetting resin 20 is then mixed with the dry mixture of the microballoons 22 and the short length fibers 24, such as by a barrel rolling technique. In the resulting dry resin mixture, the resin particles, microballoons and fibers are uniformly distributed throughout the mixture. The resin 20 is present in an amount from about 10 percent by volume to about 90 percent by volume, the microballoons 22 are present in an amount of from about 90 to about 10 percent by volume, and the fibers 24 (if used) are present in an amount from about 0.001 percent by volume to about 5 percent by volume. Preferably, the thermosetting resin 20 is present in an amount from about 18 to about 22 percent by volume, the microballoons 22 are present in an amount from about 82 to about 78 percent by volume, and the fibers 24 are present in an amount from about 0.001 percent by volume to about 4 percent by volume.

For the purposes of the invention, the thermosetting resin 20 is initially a solid which is finely divided into a particulate form or powder prior to mixing with the other components. Preferably, the thermosetting resin 20 is provided at a particle size of no greater than minus 100 mesh size by passing the powdered resin through a standard screen mesh with 100 wires per inch. More preferably, the particle size is no greater than minus 320 mesh. The thermosetting resin 20 selected for use in the invention is frangible at room temperature or sub-ambient temperatures so that the particle size of the resin can be mechanically reduced such as by grinding. The preferred thermosetting resins 20 for use in the present invention are epoxy resins, more preferably uncured epoxy resins. Exemplary epoxy resins include H. B. Fuller IF-1893 and O'Brien's Powder Products Inc. Clear EFCS9 which are ground at liquid nitrogen temperatures to a small particle size. The preferred resins consist of various difunctional higher molecular weight oligomeric epoxies and a significant amount of other multifunctional epoxy resins having an average functionality of up to about 8 epoxy groups per molecule. Advantageously, to provide high crosslink densities, high internal rigidity, and low segmental rigidity, the epoxies are typically cured by catalysis as opposed to curing agents (e.g. 2-ethyl-4-methylimidazole).

Thermosetting resins 20 are preferred in the present invention over thermoplastic resins for numerous reasons. For example, thermosetting resins can be processed at much lower temperatures than thermoplastic resins thus reducing the material and energy costs for preparing the syntactic foam material of the invention. One benefit is that high temperature molds and materials are not necessary in forming the syntactic foams of the invention. Additionally, the thermosetting resins have less solvent sensitivity and are not negatively affected by cleaning solutions. The thermosetting resin 20 is solid at room temperature or at sub-ambient temperatures for purposes of the present invention. Liquid matrix resin systems are not suitable for this purpose as the solid components in the matrix tend to be oriented along fluid flow lines during fabrication thereby producing uncontrollably anisotropic properties in the resulting foam. The cured thermosetting resins 20 used in the invention preferably have a sufficiently high glass transition temperature ($T_g$) to withstand the high temperatures often associated with aircraft environments (e.g., 250° F.). The thermosetting resin also preferably provides adequate wetting and adhesion to the microballoons and fibers at the curing temperatures to assure good mechanical properties.

The microballoons 22 used in the dry mixture are commercially available small, spherical, hollow bodies and are sometimes also termed "microspheres". As shown in FIG. 1, the microballoons consist of an outer shell or wall 28 enclosing a void 30. Microballoons are available in a range of diameters of several hundred micrometers and less, with wall thicknesses of about 1½ micrometers. Preferably, the range of diameters used in the present invention is from 5 to 150 microns. The microballoons are made from various materials, but are preferably formed primarily of glass, silica ($SiO_2$), or carbon. A suitable coupling agent such as a functionally substituted siloxane (e.g. Z-6020 and Z-6040 from Dow Corning) can be applied to coat the microballoon surface to enhance its properties. Exemplary silica microballoons for use in the invention are available from W.R. Grace & Co., Canton, Mass. under the trademark Eccospheres SI microballoons.

As illustrated in FIG. 1, the syntactic foam can include short length fibers 24. Generally, the fibers are precision chopped small diameter fibers. The fibers can be employed to reduce the bulk density of the mixed material to allow fabrication of lower density systems. The addition of the fibers produces a network structure which supports the other components, resulting in lower bulk density. The fibers are typically of an average diameter of no more than about 11 micrometers (0.45 mil) and a length of between about 0.010 and about 0.250 inch.

The short length fibers 24 can have varying mechanical properties as desired for use in the invention. For example, the tensile modulus of the fibers 24 can be selected to impart certain properties to the syntactic foams of the invention. Exemplary high modulus materials having a modulus of greater than 60 MSI (million pounds per square inch) include silicon carbide, tungsten, boron carbide, boron and carbon fibers. Exemplary intermediate modulus materials having a modulus of between 20 and 60 MSI include beryllium, titanium carbide, carbon, and steel fibers. Exemplary low modulus materials having a modulus of less than 20 MSI include copper, aluminum and carbon fibers.

In addition to reinforcing the foam structure, fibers which are electrically absorptive in RF frequencies can be used in the syntactic foams of the invention. Preferably, these fibers 24 are specifically selected to have a resistivity of between about $1\times10^{-5}$ and $1\times10^3$ ohm-cm. Suitable fibers include specially manufactured carbon fibers. When used in the syntactic foams of the invention, these fibers can produce electrically absorptive syntactic foam structures that absorb certain signals such as RF signals.

Figure 2:
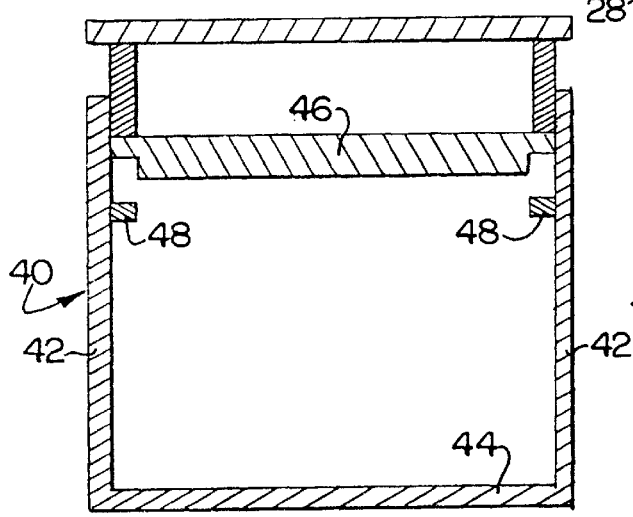
FIG. 2 is a schematic view of a mold used to prepare a syntactic foam material according to the invention.

The dry mixture comprising the solid thermosetting resin 20, the microballoons 22, and the fibers 24 can be placed into a mold having a controllable final volume. An example of such a mold 40 is the rectangular mold shown in FIG. 2. Nevertheless, the syntactic foam can be formed in U-shaped, curved, or other specially shaped molds if desired. The mold 40 of FIG. 2 has fixed side walls 42 and a fixed bottom 44. A top 46 is movable and can slide downwardly between the side walls 42. Stops 48 project inwardly from the side walls 42 and are of a sufficient length to halt the downward movement of the top 46. A sufficient amount of the mixture of components is provided to initially fill the mold above the stops 48.

The mold 40 and contained mixture are placed in an oven and heated to a temperature at or above the glass transition temperature of the uncured thermosetting resin 20. Typically, the glass transition temperatures of the uncured thermosetting resins of the invention are between about 135° F. and 225° F. As the uncured thermosetting resin 20 is heated at or above its glass transition temperature, the thermosetting resin softens and flows around the microballoons 22 and to some extent, the fibers 24 included in the array. The wetting of the microballoons 22 is important to the final mechanical properties of the material and increases the strength of the final product.

While the mixture is at or above the glass transition temperature of the thermosetting resin (but prior to reaching its gelation temperature and setting temperature), the mixture in the mold 40 can be compressed to a predetermined volume. During compression, the top 46 gradually moves downwardly (using added force if desired), until its movement is halted by the stops 48. Because the microballoons 22 are largely incompressible under the heating conditions, the downward movement of the top 46 compresses the thermosetting resin coated microballoons into any voids found within the structure. Air, which can be viewed as a component of the final product, is displaced and driven out of the mixture to the extent desired for a given product density. The amount of air that is displaced is governed by the amount of compression of the mixture. The more air that is displaced, the higher the density and the higher the strength of the final material. In the final product, the amount of air is preferably from about 3 to about 30 percent by volume.

The wetted mixture continues to be heated to the curing temperature of the thermosetting resin, generally to between about 300° F. and 400° F. As the thermosetting resin 20 cures, the resin sets and crosslinks to form a thermoset polymeric structure. Additionally, the Tg of the resin increases once the resin is cured. In practice, especially with thicker molds, the heating of the thermosetting resin is typically conducted in a series of ramp-ups, i.e., alternating steps of increasing the temperature of the mixture and maintaining the mixture at a substantially constant temperature. For example, a mold containing a dry mixture containing an epoxy thermosetting resin can be heated to 225° F. at a rate of 10° F./minute and then held at 225° F. for 15 minutes, heated to 250° F. at a rate of 10° F./minute, compressed at 250° F. to close the mold and the temperature maintained for 30 minutes, heated to 350° F. at a rate of 10° F./minute and held at 350° F. for 2 hours, and then cooled to less than 150° F. under pressure at a rate of 10° F./minute. The thermosetting resin can be selected to have a Tg which exceeds the cure temperature thereby making the resin useful in high temperature aircraft environments. For example, the O'Brien's Powder Products Inc. Clear EFCS9 has a cured Tg of about 400° F. after two hours of heating at 350° F.

As described above, the dry mixture can be placed in a mold having a controllable final volume (density and strength) and the volume can be controlled during heating by compressing the mold to attain a final preselected volume. Alternatively, the volume of a fixed shape mold can be determined and the dry mixture weighed out to fill the volume to meet a specific target density.

Figure 3:
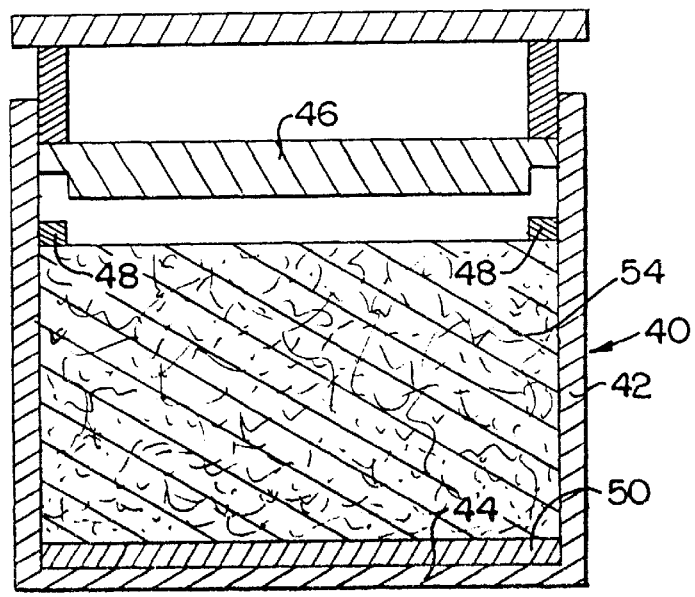
FIG. 3 is a schematic view of a mold used to prepare a syntactic foam material according to the invention including a reinforced skin.

FIG. 3 illustrates an alternative embodiment of the invention in which the wall 44 of the mold 40 is lined with a dry fabric material 50, such as a woven quartz or fiberglass cloth, having an intimately contacting thermosetting resin coated onto the fabric (specifically the individual fiber bundles) and distributed throughout the dry fabric. Alternatively, the walls 42 can also be lined with a dry fabric material having a thermosetting resin coated thereon and distributed throughout the fabric. The dry mixture 54 used to form the syntactic foam material is then applied to the fabric material 50 and can be followed by another dry fabric coated by the thermosetting resin. Preferably, the resin material used with the fabric is the same material used as the thermosetting resin 20 in the syntactic foam such as the epoxy resin described above. The dry fabric can be coated by the resin outside of the mold or placed in the mold and coated prior to adding the dry resin mixture. Preferably, the fabric is sufficiently coated with the resin to where a substantial portion of the individual yarns or fiber bundles are coated with the resin. During the heating and curing steps of the dry mixture 54, the resin material coated on the fabric material and distributed throughout the fabric is cured at the same time as the thermosetting resin in the syntactic foam thereby causing cocuring of the thermosetting resin skin on the exterior of the dry mixture. In other words, the fabric material 50 is bonded to the foam and becomes mechanically attached thereto to form a skin on the syntactic foam. Compressing the mold 40 increases the strength of the bond between the skin and the foam. Advantageously, the application of the skin according to this method can be achieved without preparing a separate liquid prepreg prior to forming the fabric skin.

In another embodiment, the electrically absorptive fibers described above can be used in the dry resin mixture and the mixture applied to the mold. Once cured, the resulting electrically absorptive syntactic foam can be bonded to an insulative syntactic foam using, e.g., an epoxy adhesive, to provide an overall foam having certain properties. Furthermore, the absorptive foam can be bonded to various combinations of foam layers to form certain foam structures. Alternatively, the dry resin mixture containing electrically absorptive fibers can be applied to the mold and a second dry mixture including either no fibers or only insulating fibers can be applied to the previously applied mixture. Subsequently, another layer of the dry resin mixture such as another layer containing electrically absorptive fibers can be applied. Once cured, the resulting syntactic foam includes an insulative layer sandwiched between absorptive layers and can be useful in certain applications. Also, other combinations of layers having differing mechanical or electrical properties can also be prepared if desired for certain applications.

Once the resin in the mold has been cured and the molded article cooled, the molded article is removed from the mold. The molded article can be removed from the mold in its finished form or in a semifinished form wherein the molded article is machined into its final shape. The resulting articles are low density articles having a density of between about 12 and about 45 lbs/ft$^3$. The articles have various applications and have been found particularly useful in the aerospace industry.

The present invention provides a structural, low-density syntactic foam article having highly uniform properties. The microballoons and the fibers used in the syntactic foams are uniformly distributed throughout the foam to supply the uniform properties desired in the invention. Furthermore, fibers used in the syntactic foams maintain a random orientation and relatively uniform distribution during the cure process to maintain good material performance. Advantageously, she foams of the invention are highly reproducible thus providing consistency in the products prepared according to the process of the invention. The syntactic foam material of the present invention has desirable electrical characteristics (e.g., RF signal absorption) for aerospace applications. There is also great flexibility in the processing of the syntactic foam material which allows for control of the final density and mechanical properties of the material thus allowing the material to be tailored for specific applications.

Many modifications and other embodiments of the invention will come to the mind of one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composite mixture for the formation of structural syntactic foam, low density articles comprising:

a plurality of microballoons;

a finely divided solid epoxy thermosetting resin; and a plurality of electrically absorptive, short length fibers having an average fiber length of between about 0.010 and about 0.250 inch, a resistivity of from about $1\times10^{-5}$ to about $1\times10^3$ ohm-cm, and an average diameter of no more than about 0.45 mil, said fibers being present in an amount between about 0.001 percent and about 5 percent by volume in said mixture.

2. The mixture of claim 1, wherein the finely divided solid epoxy resin has a particle size of no greater than minus 100 mesh size.

3. The mixture of claim 1, wherein the microballoons are present in an amount 10 percent by volume to about 90 percent by volume and the resin is present in an amount from about 90 percent by volume to about 10 percent by volume.

4. The mixture of claim 1, wherein the microballoons are present in an amount from about 82 to about 78 percent by volume, the resin is present in an amount from about 18 to about 22 percent by volume, and the fibers are present in an amount from about 0.001 percent by volume to about 4 percent by volume.

5. The mixture of claim 1, wherein the finely divided solid epoxy resin has a particle size of no greater than minus 320 mesh size.

6. The mixture of claim 1, wherein the microballoons have a diameter of between 5 and 150 microns.

7. The mixture of claim 1, wherein the microballoons are formed of glass, silica, or carbon.

8. The mixture of claim 1, wherein the microballoons include a coupling agent.

9. The mixture of claim 8, wherein the coupling agent is a functionally substituted siloxane.

\* \* \* \* \*

UNITED STATES PATENT AND TRADEMARK OFFICE
CERTIFICATE OF CORRECTION

PATENT NO. : 6,074,475  Page 1 of 1
DATED : June 13, 2000
INVENTOR(S) : Harrison et al.

It is certified that error appears in the above-identified patent and that said Letters Patent is hereby corrected as shown below:

<u>Column 8,</u>
Line 37, after "amount" insert -- from about --.

Signed and Sealed this

Fourteenth Day of August, 2001

Attest:

NICHOLAS P. GODICI
Attesting Officer  Acting Director of the United States Patent and Trademark Office